United States Patent
Norris et al.

(10) Patent No.: US 8,056,345 B2
(45) Date of Patent: Nov. 15, 2011

(54) HYBRID COOLING OF A GAS TURBINE ENGINE

(75) Inventors: James W. Norris, Lebanon, CT (US); Bernard J. Raver, Ellington, CT (US); James D. Hill, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1189 days.

(21) Appl. No.: 11/818,035

(22) Filed: Jun. 13, 2007

(65) Prior Publication Data

US 2008/0310955 A1 Dec. 18, 2008

(51) Int. Cl.
*F02C 6/04* (2006.01)

(52) U.S. Cl. ............... 60/785; 60/806; 60/736

(58) Field of Classification Search ............ 60/772, 60/39.08, 226.1, 736, 782, 785, 266; 415/114–117, 415/175–178; 416/95, 96 R, 96 A, 97 R
See application file for complete search history.

(56) References Cited

U.S. PATENT DOCUMENTS

| | | | |
|---|---|---|---|
| 2,708,564 A | 5/1955 | Erickson | |
| 3,287,906 A | 11/1966 | McCormick | |
| 3,334,685 A | 8/1967 | Burggraf et al. | |
| 3,651,645 A * | 3/1972 | Grieb | 60/262 |
| 3,844,679 A | 10/1974 | Grondahl et al. | |
| 4,137,705 A | 2/1979 | Andersen et al. | |
| 4,254,618 A | 3/1981 | Elovic | |
| 4,424,667 A | 1/1984 | Fanning | |
| 4,549,505 A * | 10/1985 | Hirano | 123/41.08 |
| 5,151,012 A | 9/1992 | Hough | |
| 5,201,634 A | 4/1993 | Hough | |
| 5,309,870 A * | 5/1994 | Ap | 123/41.21 |
| 5,317,877 A | 6/1994 | Stuart | |
| 5,388,397 A | 2/1995 | Frutschi | |
| 5,634,766 A | 6/1997 | Cuhna et al. | |
| 5,857,836 A | 1/1999 | Stickler et al. | |
| 5,954,478 A | 9/1999 | Stickler et al. | |
| 5,975,841 A | 11/1999 | Lindemuth et al. | |
| 6,142,730 A | 11/2000 | Tomita et al. | |
| 6,185,924 B1 * | 2/2001 | Matsumoto et al. | 60/806 |

(Continued)

FOREIGN PATENT DOCUMENTS

EP 1418320 A1 5/2004

(Continued)

OTHER PUBLICATIONS

S. Narayanan K.R., "What is a Heat Pipe?", http://www.cheresources.com/htpipes.shtml (visited Oct. 2, 2006).

(Continued)

*Primary Examiner* — William Rodriguez
*Assistant Examiner* — Vikansha Dwivedi
(74) *Attorney, Agent, or Firm* — Kinney & Lange, P.A.

(57) ABSTRACT

A hybrid cooling system for a gas turbine engine includes a vapor cooling assembly and a cooling air cooling assembly. The cooling air cooling assembly is configured to remove thermal energy from cooling air used to cool a first component of the gas turbine engine. The vapor cooling assembly configured to transport thermal energy from a vaporization section to a condenser section through cyclical evaporation and condensation of a working medium sealed within the vapor cooling assembly. The vaporization section is located at least partially within a second component of the gas turbine engine, and the condenser section is located outside the second component.

13 Claims, 3 Drawing Sheets

U.S. PATENT DOCUMENTS

| | | |
|---|---|---|
| 6,578,362 B1 | 6/2003 | Coffinberry |
| 6,672,075 B1 | 1/2004 | Sandu et al. |
| 6,709,492 B1 | 3/2004 | Spadaccini et al. |
| 6,931,834 B2 | 8/2005 | Jones |
| 6,939,392 B2 * | 9/2005 | Huang et al. ............... 95/46 |
| 6,990,797 B2 | 1/2006 | Venkataramani et al. |
| 7,041,154 B2 | 5/2006 | Staroselsky et al. |
| 7,153,343 B2 | 12/2006 | Burlatsky et al. |
| 7,578,652 B2 | 8/2009 | Norris et al. |
| 7,748,211 B2 * | 7/2010 | Norris et al. ............... 60/247 |
| 2005/0155353 A1 | 7/2005 | Sabatino et al. |
| 2006/0254422 A1 | 11/2006 | Spadaccini et al. |
| 2007/0022732 A1 | 2/2007 | Holloway et al. |
| 2008/0142189 A1 * | 6/2008 | Norris et al. ............... 165/11.1 |

FOREIGN PATENT DOCUMENTS

| | | |
|---|---|---|
| GB | 1516041 | 6/1978 |
| GB | 2 254 380 A | 7/1992 |
| WO | WO 2005/073539 A1 | 8/2005 |

OTHER PUBLICATIONS

Official Search Report and Written Opinion from foreign Application No. 08252045.3, filed Jun. 13, 2008.

* cited by examiner

HYBRID COOLING OF A GAS TURBINE ENGINE

BACKGROUND

The present invention relates to a hybrid system for cooling structures of gas turbine engines using a combination of vapor cooling and air cooling.

Known gas turbine engines have utilized superalloys, thermal barrier coatings (TBCs), and fluidic cooling schemes in order to provide engine structures that can operate efficiently at high temperatures and pressures while still maintaining a relatively long lifespan. Furthermore, "cooled" cooling air systems have been developed that reject thermal energy from air that is then used to provide cooling to various gas turbine engine components. However, the ability to provide cooled cooling air in a volume and with adequately low thermal energy to provide cooling to all of the static and rotating components of a gas turbine engine would be extremely demanding on the cooled cooling air systems, making suitable cooled cooling air systems undesirably large, heavy and complex. Therefore, it is desired to provide improved cooling capabilities for gas turbine engines, in order to better maintain engine components at temperatures below designated maximum operating temperature levels.

SUMMARY

A hybrid cooling system for a gas turbine engine includes a vapor cooling assembly and a cooling air cooling assembly. The cooling air cooling assembly is configured to remove thermal energy from cooling air used to cool a first component of the gas turbine engine. The vapor cooling assembly configured to transport thermal energy from a vaporization section to a condenser section through cyclical evaporation and condensation of a working medium sealed within the vapor cooling assembly. The vaporization section is located at least partially within a second component of the gas turbine engine, and the condenser section is located outside the second component.

DETAILED DESCRIPTION

In general, the present invention relates to a hybrid cooling system for a gas turbine engine that utilizes both a "cooled" cooling air subsystem and a vapor cooling subsystem in order to help maintain engine components at temperatures below designated maximum operating temperature levels. Such a hybrid cooling system allows the size and complexity of the cooled cooling air subsystem to be offset by use of the vapor cooling subsystem. Cooled cooling air can be provided, for example, primarily to rotatable engine components, while the vapor cooling subsystem can be used to primarily cool static (i.e., non-rotating) engine components. Such a hybrid cooling system can substantially reduce cooling air expenditure and overall cooling system weight, each of which helps provide engine efficiency gains and cycle power increases.

As used herein, the term "static" as applied to gas turbine engine components generally refers to non-rotating components, although such components may be subject to some movement, for instance, when installed in an engine of a movable vehicle.

Figure 1:
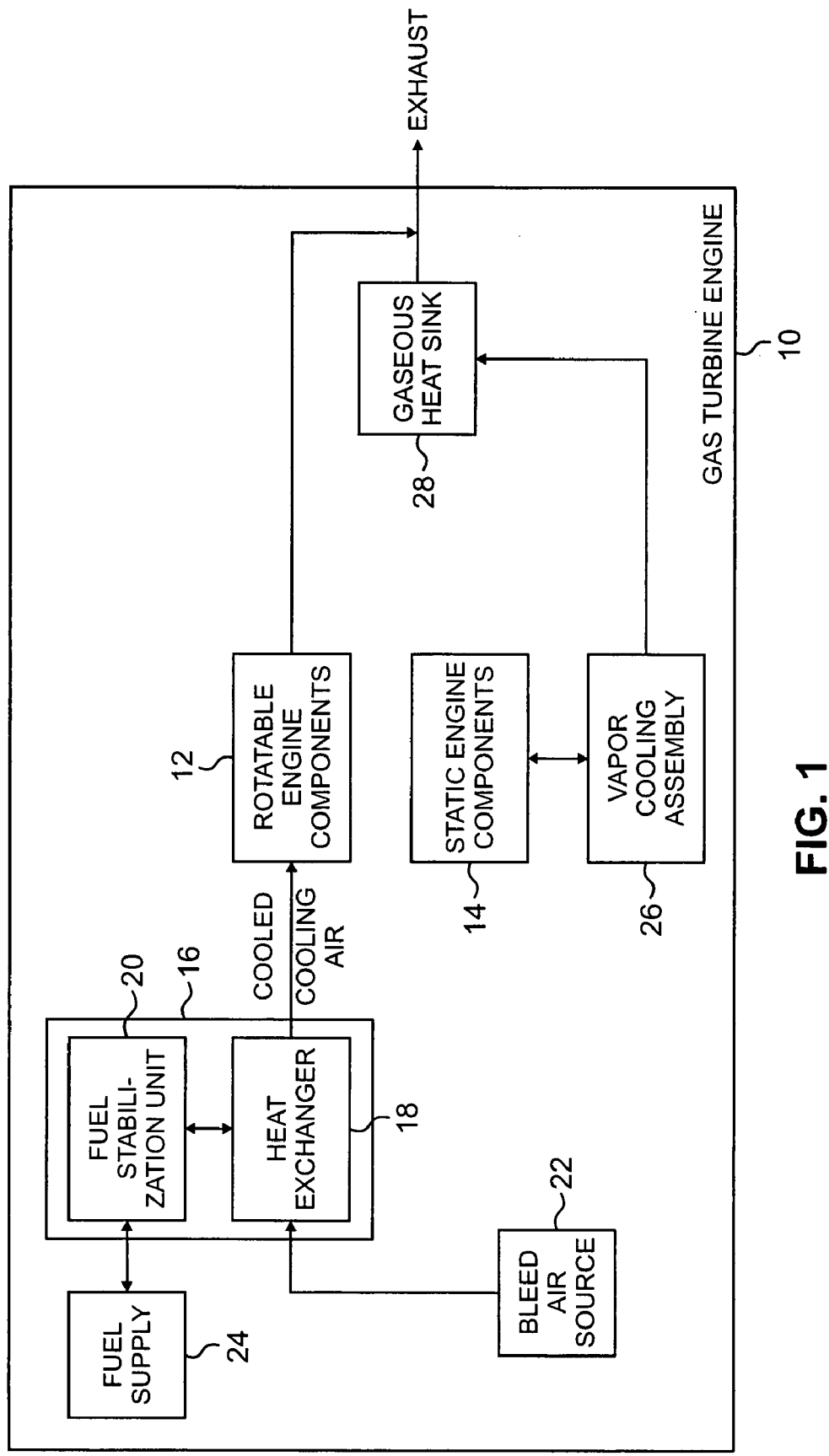
FIG. 1 is a block diagram of a gas turbine engine having a hybrid cooling system according to the present invention.

FIG. 1 is a block diagram of a gas turbine engine 10 that includes rotatable engine components 12 (e.g., turbine blades, rotors, etc.) and static engine components 14 (e.g., vanes, shroud rings, etc.). The representation of the gas turbine engine 10 in FIG. 1 is simplified for clarity, but those of ordinary skill in the art will recognize that the present invention can be applied to essentially any type of gas turbine engine.

In the illustrated embodiment, a "cooled" cooling air assembly 16 provides cooled cooling air to the rotatable engine components 12. The cooled cooling air assembly 16 includes a heat exchanger 18 and a fuel stabilization unit (FSU) 20. The heat exchanger 18 accepts bleed air (e.g., compressor bleed air) from a bleed air source 22 and transfers thermal energy from the bleed air to a liquid fuel from a fuel supply 24 via the FSU 20. The heat exchanger 18 provides a means to transfer thermal energy between two fluids while maintaining physical separation of those fluids. Here, the liquid fuel passing through the heat exchanger 18 acts as a heat sink to accept thermal energy from the gaseous bleed air. The bleed air passing through the heat exchanger 18 is cooled, in order to produce the cooled cooling air that is then routed to the rotatable engine components 12 to provide a desired cooling effect. Cooled cooling air that is heated as a result of cooling the rotatable engine components 12 can then be rejected as exhaust. The heat exchanger 18 can be of a conventional configuration, or can be configured as disclosed in commonly-assigned U.S. Patent Application Publication No. 2008/0142189, entitled "Vapor Cooled Heat Exchanger," filed Dec. 19, 2006, which is hereby incorporated by reference in its entirety.

The fuel that accepts thermal energy from the bleed air in the heat exchanger 18 has limits as to how much heat can be accepted before that fuel degenerates or auto-ignites. Therefore, the FSU 20 is provided, which help prevent fuel degeneration. In general, the FSU 20 can act as a fuel deoxygenator to reduce oxygen concentration in the fuel, which can reduce undesired "coking" effects, and thereby allows the engine 10 to operate with elevated fuel temperatures. The FSU 20 can have a known configuration. Fuel leaving the FSU 20 is ultimately routed to a combustor assembly (not shown in FIG. 1) where it is burned to power the engine 10.

The static engine components 14 are cooled using a vapor cooling assembly 26. In general, the vapor cooling assembly is configured to transport thermal energy from a vaporization section to a condenser section at a relatively high rate through cyclical evaporation and condensation of a working medium sealed within the vapor cooling assembly 26. Thermal energy can be transferred from the vapor cooling assembly 26 to a gaseous heat sink 28, for example, relatively cool air in a fan bypass stream. The gases of gaseous heat sink 28 are ultimately ejected from the engine 10 as exhaust.

Figure 2:
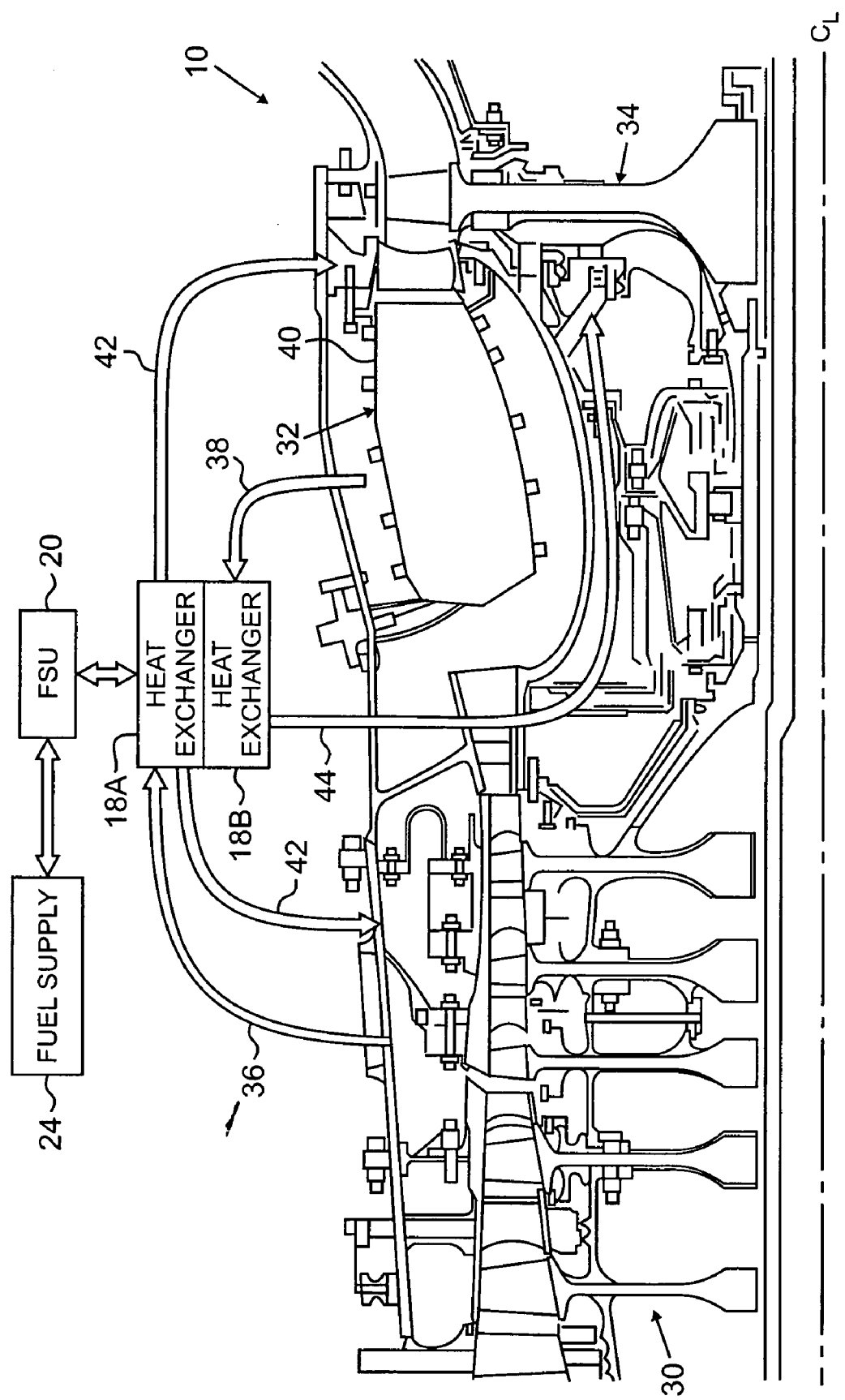
FIGS. 2 and 3 are schematic cross-sectional views of portions of the gas turbine engine.

FIG. 2 is a schematic cross-sectional view of a portion of the gas turbine engine 10, showing one embodiment of the cooled cooling air assembly 16. As shown in FIG. 2, the gas turbine engine 10 includes a compressor section 30, a combustor assembly 32 and a turbine section 34, all arranged relative to an engine centerline $C_L$. In the illustrated embodiment, two heat exchangers 18A and 18B provide low-pressure and high-pressure cooling circuits, respectively, both of which are operatively connected to the FSU 20. Low-pressure bleed air 36 is routed to the heat exchanger 18A from the compressor section 30, and high pressure bleed air 38 is routed to the heat exchanger 18B from the combustor assembly 32 (e.g., from a plenum surrounding an annular combustor liner 40). Furthermore, low-pressure cooled cooling air 42 is routed from the heat exchanger 18A to desired areas (e.g., areas that are radially outside of a primary gas flowpath of the engine 10), and high-pressure cooled cooling air 44 is routed from the heat exchanger 18B to other desired areas (e.g., areas that are radially inward from a primary gas flowpath of the engine 10). Ultimately, the high-pressure cooled cooling air 44 and/or the low-pressure cooled cooling air 42 can be used to cool various components, such as the rotating components including turbine blades and rotors in the turbine section 34. It should be noted that the high-pressure cooled cooling air 44 would generally not be exposed to the primary gas flowpath of the engine 10, but, as necessary for particular applications, would be routed through suitable conduits to radially cross the primary flowpath (typically at locations upstream from the combustor assembly 32). The low-pressure cooling circuit of associated with the low-pressure bleed air 36 and the low-pressure cooled cooling air 42 can be isolated from the high-pressure cooling circuit associated with the high-pressure bleed air 38 and the high-pressure cooled cooling air 44, such that gases in those two circuits do not mix or interact. In the illustrated embodiment, the heat exchangers 18A and 18B are separate units, although in alternative embodiments, a single heat exchanger unit can be utilized that is configured to maintain separation between the low and high-pressure cooling circuits.

Figure 3:
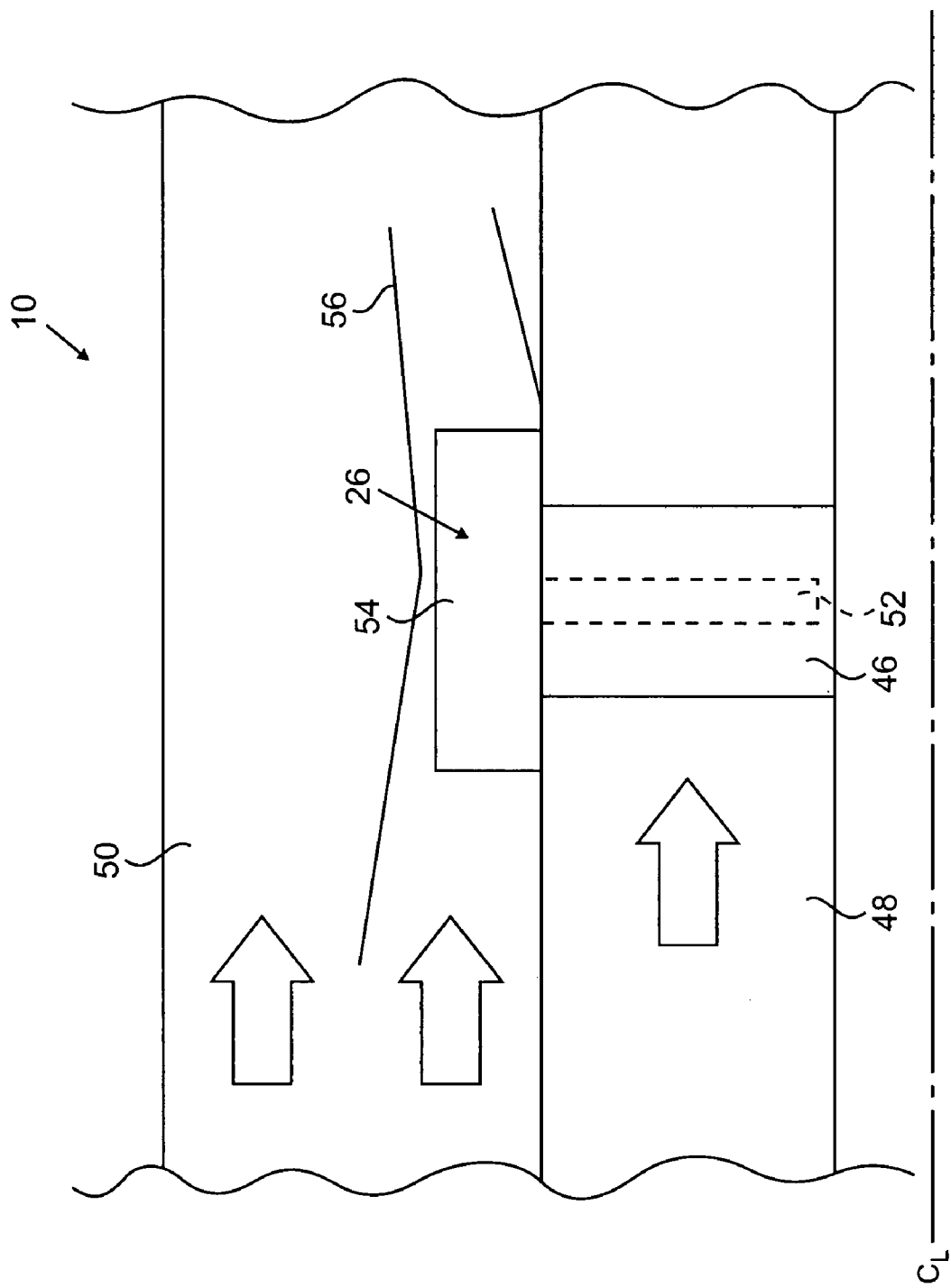

FIG. 3 is a schematic cross-sectional view of another portion of the gas turbine engine 10. As shown in FIG. 3, the gas turbine engine 10 includes a vane 46 extending into a primary flowpath 48, a fan bypass duct 50, and a vapor cooling assembly 26. In the illustrated embodiment, the vapor cooling assembly 26 includes a vaporization section that extends into the vane 46 and a condenser section 54 that is exposed to airflow in the fan bypass duct 50. An optional flow guide 38 positioned in the fan bypass duct 50 functions to direct air in the fan bypass duct 50 toward and past the condenser section 54 of the vapor cooling assembly 26, and can then direct air heated by the condenser section 56 back to the fan bypass flowpath.

The vapor cooling assembly 26 functions as a heat pipe that uses an evaporative cooling cycle to transfer thermal energy through the evaporation and condensation of a working medium, such as disclosed in commonly-assigned U.S. patent application Ser. No. 11/654,472, entitled "Vapor Cooled Static Turbine Hardware," filed Jan. 17, 2007 and commonly-assigned U.S. patent application Ser. No. 11/642,010, entitled "Vapor Cooling of Detonation Engines," filed Dec. 19, 2006, which are both hereby incorporated by reference in their entireties. In general, the vapor cooling assembly 26 utilizes an evaporative cooling cycle to transfer thermal energy from the vane 46 to air passing through the fan bypass duct 50. Thermal energy absorbed by the vane 46 from the hot gases in the combustion gas flowpath 48 heats the vaporization section 52, which causes the working medium in the vaporization section 52 to evaporate. Moreover, the relatively cool air in the fan bypass duct 50 absorbs thermal energy from the condenser section 54, and causes the vaporized working medium to condense. The working medium physically moves between the vaporization section 52 and the condenser section 54, in order to transfer thermal energy between the locations where evaporation and condensation occur. The composition of the working medium used in the vapor cooling assembly 26 is selected according to the particular operating conditions at which heat transfer is desired. Thermal energy added to air in the fan bypass duct 50 raises the temperature and pressure of that air, which contributes to thrust output of the engine 10 and lessens energy loss due to the vapor cooling assembly 26.

In traditional gas turbine engine cooling systems using cooling air to cool both static and rotating engine components, approximately twice as much cooling air (by volume) goes toward cooling static components as toward cooling rotating components. The present invention allows cooling air expenditures for static components to be reduced or eliminated, thereby allowing approximately two-thirds savings in cooling air expenditure over prior art systems. Furthermore, by decreasing cooling air expenditure, the present invention allows the use of significantly smaller-volume cooled cooling air assemblies than would otherwise be needed, allowing the overall weight of a hybrid cooling system of the present invention to be approximately half the weight of cooling systems that would utilize only cooling air to cool both static and rotatable components of an engine. For example, smaller volume cooled cooling air assemblies can utilize smaller heat exchangers, which can greatly contribute to weight reductions. These features of the present invention help provide engine efficiency gains and cycle power increases.

Although the present invention has been described with reference to preferred embodiments, workers skilled in the art will recognize that changes may be made in form and detail without departing from the spirit and scope of the invention. For instance, the rotatable components can be cooled with both air cooling and vapor cooling as disclosed in commonly assigned U.S. patent application Ser. No. 11/542,097, entitled "Hybrid Vapor and Film Cooled Turbine Blade," filed Oct. 3, 2006, which is hereby incorporated by reference in its entirety. Moreover, the particular manner in which cooled cooling air is routed through an engine, and the configuration of vapor cooling assemblies can vary as desired for particular applications.

What is claimed is:

1. A hybrid cooling system for a gas turbine engine, the system comprising:
a cooling air cooling assembly for removing thermal energy from cooling air used to cool a first component of the gas turbine engine; and
a vapor cooling assembly configured to transport thermal energy from a vaporization section to a condenser section through cyclical evaporation and condensation of a working medium sealed within the vapor cooling assembly, wherein the vaporization section is located at least partially within a second component of the gas turbine engine, and wherein the condenser section is located outside the second component.

2. The system of claim 1, wherein the cooling air cooling assembly comprises:
a heat exchanger for transferring thermal energy from the cooling air to fuel; and
a fuel stabilization unit configured to operably interact with the fuel to which thermal energy has been transferred.

3. The system of claim 2, wherein the heat exchanger is a vapor cooled heat exchanger.

4. The system of claim 2, wherein the heat exchanger is smaller than would otherwise be required to cool the second component if air cooling were used instead of the vapor cooling assembly.

5. The system of claim 1, wherein the condenser section of the vapor cooling assembly is configured to reject thermal energy to a bypass duct of the gas turbine engine.

6. The system of claim 1, wherein the cooling air cooling system is configured to remove thermal energy from bleed air from a high-pressure compressor assembly.

7. The system of claim 1, wherein the first component comprises a turbine blade.

8. The system of claim 1, wherein the second component comprises a vane.

9. A hybrid cooling system for a gas turbine engine having rotatable components and a non-rotatable component, the system comprising:
   an air cooling assembly for removing thermal energy from bleed air used to provide cooling to the rotatable components of the gas turbine engine, the air cooling assembly comprising:
      a heat exchanger for transferring thermal energy from the bleed air to fuel; and
      a fuel stabilization unit for reducing coking of the fuel to which thermal energy has been transferred; and
   a vapor cooling assembly configured to transport thermal energy from a vaporization section to a condenser section through cyclical evaporation and condensation of a working medium sealed within the vapor cooling assembly, wherein the vaporization section is located at least partially within the non-rotatable component, wherein the condenser section is located outside the non-rotatable component.

10. The system of claim 9, wherein the heat exchanger is smaller than would otherwise be required to cool the non-rotatable component if air cooling were used to cool the non-rotatable component instead of the vapor cooling assembly.

11. The system of claim 9, wherein the condenser section of the vapor cooling assembly is configured to reject thermal energy to a bypass duct of the gas turbine engine.

12. The system of claim 9, wherein the air cooling system is configured to remove thermal energy from bleed air from a high-pressure compressor assembly.

13. The system of claim 9, wherein the rotatable components include a turbine blade, and wherein the non-rotating component comprises a vane.

* * * * *